(12) United States Patent
Manning et al.

(10) Patent No.: US 7,842,322 B2
(45) Date of Patent: Nov. 30, 2010

(54) METHODS AND PRODUCTS PRODUCED THEREBY TO REDUCE AGGLOMERATION OF GRANULAR FOODS

(75) Inventors: Douglas M. Manning, Middletown, PA (US); Justin E. Comes, Harrisburg, PA (US)

(73) Assignee: Mars, Incorporated, McLean, VA (US)

( * ) Notice: Subject to any disclaimer, the term of this patent is extended or adjusted under 35 U.S.C. 154(b) by 1310 days.

(21) Appl. No.: 10/341,375

(22) Filed: Jan. 14, 2003

(65) Prior Publication Data

US 2003/0170362 A1    Sep. 11, 2003

Related U.S. Application Data

(60) Provisional application No. 60/348,799, filed on Jan. 15, 2002.

(51) Int. Cl.
*A23L 1/00* (2006.01)
(52) U.S. Cl. ...................................... 426/443; 426/442
(58) Field of Classification Search .................. 426/453, 426/569, 584, 590, 811
See application file for complete search history.

(56) References Cited

U.S. PATENT DOCUMENTS

| | | | |
|---|---|---|---|
| 2,147,549 A | | 2/1939 | Ludwig |
| 3,006,763 A | | 10/1961 | Willard et al. |
| 3,248,226 A | | 4/1966 | Stewart, Jr. ..................... 99/26 |
| 3,607,310 A | * | 9/1971 | Carter, Jr. .................... 426/311 |
| 4,179,525 A | * | 12/1979 | Kleinschmidt ............... 426/19 |
| 4,338,350 A | | 7/1982 | Chen et al. |
| 4,423,085 A | | 12/1983 | Chen et al. |
| 5,264,228 A | | 11/1993 | Pray et al. .................... 426/285 |
| 5,338,555 A | | 8/1994 | Caly ........................... 426/96 |
| 5,487,904 A | | 1/1996 | Caly ........................... 426/96 |
| 5,523,110 A | * | 6/1996 | Mandralis et al. ............ 426/660 |
| H001620 H | * | 12/1996 | Dolan et al. ................ 426/593 |
| 6,165,518 A | | 12/2000 | Moore et al. |
| 6,168,820 B1 | * | 1/2001 | Garwood et al. ............ 426/573 |

FOREIGN PATENT DOCUMENTS

| | | |
|---|---|---|
| CA | 835 323 | 2/1970 |
| CA | 863 271 | 2/1971 |
| DE | 11 35 739 | 8/1962 |
| DE | 1 492 985 | 4/1970 |
| DE | 28 09 536 | 9/1979 |
| EP | 0 688 506 | 12/1995 |
| EP | 505594 B2 | 7/1996 |
| EP | 740904 A1 | 11/1996 |
| EP | 0 826 315 | 3/1998 |
| GB | 1 293 476 | 10/1972 |

OTHER PUBLICATIONS

Omobuwajo, T.O., et al., "Thermal Agglomeration of Chocolate Drink Powder", Journal of Food Engineering, vol. 46, No. 2, pp. 73-81 (2000).
Schuchmann, H., et al., "Jet Agglomeration of Powders", Chemical-Ing.-Tech., vol. 67, No. 4, pp. 467-470 (1995).
Kirchmann, A., "Continuous Agglomeration of Cocoa Mixes", Food Marketing and Technology, vol. 7, No. 3, pp. 28-32 (1993).
LaBell F., "Co-Crystallisation Process Aids Dispersion and Solubility. Sugar Plays New R le as Free-Flowing Carrier", Food Processing, vol. 52, No. 8, pp. 60-66 (1991).
Jewell G.G., "Interactions of Confectionery Components", *Interactions of Food Compon nts*, pp. 277-297 (1986).
Niediek, E.A., "Grinding and Particle Size Analysis in Food Technology with Particular Reference to Cocoa and Sugar", European Federation of Chemical Engineering, (Engineering and Food Quality Symposium) pp. 366-379 (1975).
Bartusch, W., Lecture: "Effect of the Agglomerate Structure on Instant Properties of Agglomerated Cocoa-Sugar Mixtures", Institut fur Lebensmitteltechnologie und Verpackung Symposium, pp. 308-317 (1974).

* cited by examiner

*Primary Examiner*—Lien Tran
(74) *Attorney, Agent, or Firm*—Fitzpatrick, Cella, Harper & Scinto

(57) ABSTRACT

The reduction of agglomeration amongst granular food particles by combining one or more granular foods with one or more novel flow agents that do not adversely impact the granular food or, alternatively, a food product produced therefrom. The invention facilitates the transport, storage, and processing of granular foods.

8 Claims, No Drawings

METHODS AND PRODUCTS PRODUCED THEREBY TO REDUCE AGGLOMERATION OF GRANULAR FOODS

This application claims the benefit of U.S. Provisional Patent Application No. 60/348,799, filed on Jan. 15, 2002.

BACKGROUND OF THE INVENTION

1. Field of the Invention

The present invention relates to the reduction of agglomeration amongst granular food particles. It is carried out by combining one or more granular foods with one or more novel flow agents that do not adversely impact the granular food or, alternatively, a food product produced therefrom. The invention facilitates the transport, storage, and processing of granular foods.

2. Related Background Art

The edible food product industry is a vital part of any modem economy. Although there is a wide variance in the industry, most edible food product producers receive different components of the edible food products at one or more locations where these components are combined and/or transformed into the edible food products. Further, different components may be combined at different locations and then sent to one location where a final edible food product is prepared and/or packaged for distribution.

Due to the increasing international nature of the world economy, these food components may arrive from points all over the world. Further, the components can be transported in many ways. For example, the components may arrive by rail, road, water, and even air. Additionally, the components can arrive packaged in many different ways. The packaging forms may include boxes, bags, and bulk tanks found on water vessels, train cars, and trucks. Lastly, the components themselves can be in liquid form, dry form, and forms in between. Dry forms continue to constitute a large portion of shipped food components.

In many instances, dry foods can pose numerous problems. Since most dry foods are at least partially soluble in water, many tend to "clump" or agglomerate during shipping, storage, and/or processing. Agglomeration can be severe enough to form agglomerates that are pea, golf ball, softball, basketball, and even larger in size. Worse yet, the agglomerates may adhere to the sides of their container immobilizing at least part, if not all, of the container's contents. Further, the agglomerates can be as soft as packed sand or as hard as a rock.

It is believed that most agglomeration can be attributed to temperature, moisture, and/or overburden pressure encountered by the food particles during transportation and/or storage. Heat can soften some food particles making them more susceptible to agglomeration. Moisture can cause the surfaces of some particles, e.g. sugar, to become tacky such that particle agglomeration occurs. Temperature and/or humidity cycling may exacerbate sugar clumping since, as moisture evaporates, it leaves behind sugar bridges; and, each successive cycle may act to strengthen already formed bridges making clumps more difficult to break. Smaller sugar particles tend toward severe sugar bridging problems due to their larger surface area per unit mass. More surface area translates into more potential sugar bridge anchoring points. Over burden pressure resulting from particles being stored, especially in large quantities, can cause compaction and therefore agglomeration, particularly amongst particles lower or deeper in the storage containers. Any one or a combination of the above identified factors can lead to agglomeration of food particles.

While the industry has attempted to address these factors, many purported solutions have proven ineffective, impractical, unsuitable, and/or costly. For example, it is well-known that starch is used as an anti-clumping agent in confectioner's sugar; however, certain confectionery processes will not readily dissolve starch since some starch requires heat and sufficient moisture to go into solution. Further, disassociated starch may not be a desirable ingredient to use in specific confectionery recipes and manufacturing processes. Other known anti-caking agents include calcium phosphate, calcium silicate, microcrystalline cellulose, magnesium carbonate, magnesium silicate, magnesium stearate, silicon dioxide, and sodium silicoaluminate. However, these agents may also be unsuitable for the manufacture of some foods including confectionery foods particularly in their free or disassociated forms.

Bulk storage containers, including bulk bags and other containers, individually or those on railcars, trucks, water vessels, and air vessels are a common mode of transport and storage for bulk food. Although some may be designed to be airtight upon closure, many often are not or do not continue to be airtight, especially after repeated loading and unloading of the bulk foods. Some bulk containers are designed to permit forced airflow throughout the interior. The air is intended to "fluff" the particles and minimize agglomeration by reducing over burden pressure as well as inter-particle contact. However, aerated bulk tanks can be costly, as well as deleterious to particle agglomeration. The air may be a source of humidity, and, as previously discussed, may contribute to particle agglomeration. Further, air dessication means can be cost prohibitive and complex, especially when properly maintained.

If agglomeration is not inhibited, a myriad of problems can result. Transport and storage containers or packages may be difficult, if not impossible, to load and unload. This may lead to the inability to load at the plant or the inability to unload at a delivery point. Rejection of all or part of a shipment can result. In turn, rejection of a shipment may lead to production delays if not an outright cessation of production activities.

Even if the granular food and its agglomerates can be loaded or unloaded in their entirety, processing problems can occur downstream. For example, the agglomerates may be difficult to combine with, or dissolve in, other food product components also leading to a delay or cessation of production activities. Other problems are well-known to dry foods handlers.

Accordingly, there remains a need for a simple, effective, and cost conscious way to reduce the agglomeration of granular foods.

SUMMARY OF THE INVENTION

The need is met by the present invention wherein disclosed is a simple, effective, and cost conscious way to reduce the agglomeration of granular foods.

A first embodiment is a method to reduce the agglomeration of a granular food by combining the granular food with a flow agent in amounts that do not adversely impact the granular food or a food produced therefrom such that agglomeration of the granular food is reduced and wherein the flow agent is selected from the group consisting of cocoa powder, peanut flour, and combinations thereof.

A second embodiment is a substantially free-flowing food composition having from about 61% to about 99.9% by weight granular food and from about 0.1% to about 9% by weight flow agent, wherein the flow agent is selected from the group consisting of cocoa powder, peanut flour, and combinations thereof.

A particularly preferred embodiment of this invention is directed to a method to reduce the agglomeration of sugar by combining the sugar with cocoa powder to form a mixture wherein the sugar and cocoa powder are combined in amounts that do not adversely impact the sugar or a food produced therefrom and such that agglomeration of the sugar is reduced.

Surprisingly, it has been discovered the novel flow agents deliver increased flow capabilities to sugar without the need for other flow agents. In addition, it has also been surprisingly discovered that the particularly preferred combination of sugar and cocoa powder has significantly reduced agglomeration despite being formed by individual components that tend to agglomerate.

Unless otherwise stated, all units of measure are standard SI units. Any cited documents are, in relevant part, incorporated herein by reference. Various alterations to the present invention will be apparent to a skilled artisan upon reading this specification including the claims appended hereto.

DETAILED DESCRIPTION OF THE INVENTION

As used herein, the term "granular food" is intended to mean any particulate matter or combination of particulate matter that is safely edible by an organism either in its present state or upon combination with other components. Of particular interest are granular foods whose particles are at least slightly hydrophilic since hydrophilic particles tend to suffer more from agglomeration when exposed to moisture. The particles can range in size and mean particle sizes of individual grains can be defined as follows: "coarse grains" from about 1.2 mm to about 2.5 mm, "medium grains" from about 0.5 mm to about 1.4 mm, "fine grains" from about 0.2 mm to about 0.75 mm, "extra fine grains" from about 0.075 mm to about 0.3 mm, and "powders" from about 0.0001 mm to about 0.12 mm. A particularly preferred granular food may be sugar.

As used herein, the term "sugar" is intended to mean any sucrose or sweet tasting matter or combination of matter. Besides sucrose, other exemplary sugars include dextrose, glucose, fructose, levulose, lactose, maltose, cellobiose, and sugar substitutes.

As used herein, the term "sucrose" refers to crystalline dextrorotatory disaccharide sugar, $C_{12}H_{22}O_{11}$, that occurs naturally in many plants like, for example, sugarcane and sugarbeet. Additionally, sucrose does not reduce Fehling's solution to produce a color precipitate, is stable in air, is hydrophilic and capable of absorbing moisture, and may be hydrolized to glucose and fructose by acid as well as invertase. In granular form, sucrose is encompassed by the term granular food and may include, for example, raw sugar, brown sugar, confectioner's sugar, refined sugar, white refined sugar, pure cane sugar, and combinations thereof. The sucrose may be at least about 96% pure, preferably at least about 98% pure, and most preferably from about 99% to about 99.9% or even about 99.99% pure, and may contain from about 0.01% to 0.4% pre-shipping moisture, from about 0% to about 1% reducing sugars, and from about 0% to about 0.5% ash.

As used herein, the term "flow agent" is intended to mean any particulate matter or combination of particulate matter that is safely edible by an organism either in its present state or upon combination with other components. The particles of the novel flow agent can range in size from about 0.1 microns to about 1000 microns, preferably from about 0.1 microns to about 500 microns, even more preferably from about 0.1 microns to about 200 microns, and most preferably from about 0.1 microns to about 100 microns. It is preferred the novel flow agent does not adversely impact the granular food itself or, alternatively, a food including the novel flow agent. It should also be noted that certain granular food ingredients can have their components extracted into water whereupon they may further react or develop otherwise undetectable flavors, particularly after the addition of heat. For example, cocoa powder, when placed in water and heated may create a confectionary product with increased cocoa essence, more bitter and caramelized flavors, as well as fruity or other flavor notes. Accordingly, compositions prepared in accordance with the present invention may be mixed with water and, optionally, heated, to prepare a sugar/corn syrup confectionery base.

Without wishing to be bound by theory, it is believed that particles with desiccative qualities are better flow agents since moisture is thought to be the largest contributor to particle agglomeration. Accordingly, it is preferred that the novel flow agent consist at least partly of particles that are at least minimally desiccative in nature. The novel flow agent is free of any added starch, methyl cellulose, and alginate, without a large impact on the efficacy of the novel flow agent to prevent food particle agglomeration. In fact, for use in the present invention, it is preferred the novel flow agent be free of any added starch, calcium phosphate, calcium silicate, microcrystalline cellulose, magnesium carbonate, magnesium silicate, magnesium stearate, silicon dioxide, and sodium silicoaluminate. Preferred flow agents include cocoa powder, peanut flour, and combinations thereof. The novel flow agents may be of the fat-containing, reduced fat, and fat-free varieties. A particularly preferred novel flow agent is cocoa powder.

As used herein, the term "adverse impact" with reference to food is intended to mean that an intended consumer would object to an experience resulting from an aesthetic encounter with the food and therefore be less likely to consume the food. Avoiding adverse impact on the food can be carried out by using the novel flow agent in amounts that do not adversely impact the food. These amounts may vary for different flow agents and different granular foods depending on the relative strength of the flow agent's aesthetics to those of the granular food's aesthetics.

As used herein, the term "food" is intended to mean a food item that is safely edible by a human or animal and is prepared from a granular food or a granular food/flow agent combination.

As used herein, the term "cocoa powder" is intended to refer to the press cake obtained by removing at least a part of the cocoa butter from cocoa liquor. This removal may be performed via mechanical pressing or other extraction means. The press cake may be ground or milled to produce particles of varying mean sizes including powder. The particle size for cocoa powder can range from about 0.1 microns to about 1000 microns, preferably from about 0.1 microns to about 500 microns, even more preferably from about 0.1 microns to about 200 microns, and most preferably from about 0.1 microns to about 100 microns. Cocoa powder typically contains 10-12% fat on the low side and 22-24% fat on the high side, 17-25% protein, 9-15% starch, 1-4% sugars, 19-25% cell wall constituents, 2-5% organic acids, 4-13% ash, and 2-5% moisture. Cocoa powder may also contain polyhydroxyphenols, theobromine, and caffeine. Fat-free and reduced-fat cocoa powders are also suitable for use in the present invention and are preferred novel flow agents for low- and high-temperature applications whereas higher fat (e.g., 54%) cocoa powders, including powdered cocoa liquor, may be used in lower temperature applications.

As used herein, the term "peanut flour" refers to a product obtained by pressing, grinding, or milling peanuts into particulate form. Peanuts contain a substantial amount of oil that causes the pressed or milled product to be pasty or creamy. To arrive at peanut flour, therefore, at least some, if not all, of the natural oils or fats must be removed. Although typical peanut flour contains about 12% oil or fat and has the consistency of a particulate solid, a flour with more or less than 12% fat or oil may be used. Reduced-fat and fat-free peanut flours are particularly preferred. Peanut flour is known to skilled artisans and is available commercially. Other nut flours may also be used in the present invention.

As stated before, agglomeration of granular food particles can pose numerous problems during transport, storage, and/or processing. It is believed that a large part of particle agglomeration problems arise out of inter-particle contact in the presence of moisture. Further, large amounts of moisture need not be present to create agglomeration problems. In fact, humidity alone can provide enough moisture to create particle tackiness and, resultantly, agglomeration problems of varying degrees. The problem is exacerbated by particles that have a natural tendency to be tacky when moist, e.g., sugar.

Herein are provided methods to reduce the agglomeration of food particles by combining granular foods with a novel flow agent that reduces inter-particle contact. Not wishing to be bound by theory, it is believed the novel flow agent provides an at least partial contact barrier between granular food particles thereby reducing surface interaction between granular food particles. This reduction in granule surface to surface contact is important since inter-granule contact is required for most, if not all, food particle agglomeration. In the case of many granular foods, as soon as moisture evaporates, inter-granule bridges are existent. Further, as hereinbefore discussed, the desiccative ability of a novel flow agent particle may also contribute to the reduction of granular food particle agglomeration since the novel flow agent may serve as a sacrificial surface barrier for the granular food reducing, if not eliminating, the amount of moisture that contacts the surfaces of the granular food particles.

Not wishing to be bound by theory, it is believed that desiccative novel flow agent particles provide a benefit that is two-fold. First, as discussed above, the novel flow agent particles provide an at least partial contact barrier between granular food particles thereby reducing inter-particle contact. Second, a desiccative novel flow agent particle barrier may aid in keeping the surfaces of many granular food particles dry. If at least a portion of granular food particles are converted to particles with a protective and/or desiccative barrier, granular food particle surfaces are now less likely to interact with the surfaces of other granular food particles and are, thereby, less likely to bridge with other granular food particles. The reduction in tacky particles results in less agglomerated granular food shipments. The granular food and novel flow agent may be combined in several relative weight ratios while operating within the parameters of the present invention.

The granular food and novel flow agent are preferably combined in relative weight ratios such that the granular food or, alternatively, a food produced therefrom, is not adversely impacted. For example, cocoa powder may be combined with sugar in amounts of up to 10%, more preferably up to about 9%, even more preferably up to about 5%, even more preferably up to about 3%, and most preferably up to about 2% by weight of the sugar, without adversely impacting a food produced from the sugar. The sugar may contain cocoa powder in amounts of at least about 0.1%, preferably at least about 0.5%, or more preferably at least about 1% by weight of the sugar, depending on storage and transportation conditions, in order to be effective as a flow agent.

Other components may be included in the sugar/flow agent mixture, e.g., to preempt steps further in a production process. Any additional components may or may not be prone to agglomeration and may include any particulate or granular food(s) including, but not limited to, flavor powders or crystals, dairy powders, whey powders, soy powders, baking components such as flour, and the like. Whether other components are included in the sugar/flow agent mixture or not, it is preferable that the mixture comprise at least about 61% sugar, more preferably at least about 75% sugar, even more preferably at least about 91% sugar, even more preferably at least about 95% sugar, even more preferably at least about 97% sugar, even more preferably at least about 98% sugar, and most preferably at least about 99.5% sugar, by weight of the mixture. Further, the upper limits for cocoa powder may be on the high side when cocoa powder-containing sugar is used to produce, for example, nougat, caramel, and other confections, and on the low side when cocoa powder-containing sugar is used, for example, as an ordinary beverage sweetener.

Surprisingly, it has been discovered that for some granular food-novel flow agent combinations, e.g. sugar-cocoa powder combinations, a mixture that is less agglomerated is formed despite the individual components' tendencies toward agglomeration. In other words, while sugar and cocoa powder individually have a tendency to agglomerate, when combined, little, if any agglomeration is observed. Further, any clumps that may have formed are likely to be easily dispersed or broken-up, unlike non-cocoa powder-containing sugar clumps. In order to better achieve these surprising results, it is preferred that the granular food-novel flow agent mixture is relatively homogenous such that the benefits of the novel flow agent are provided to a substantial portion, more preferably most, of the granular food particles.

A skilled artisan will know numerous ways to create a homogeneous mixture of granular food and novel flow agent. One way is metering novel flow agent into a granular food during any one of several transfers from, for example, a production facility to a silo, a silo to a bulk transport tank, or a bulk transport tank to a silo. Further, for most, if not all, granular foods and novel flow agents, homogeneity of the mixture increases, up to a point, with every bulk transfer after the novel flow agent is added to the granular food. Another way to create a homogeneous mixture of granular food and novel flow agent is combining the granular food and novel flow agent in a batch mixer or bulk blender. Other continuous and batch processes will be apparent to the skilled artisan. The following non-limiting examples illustrate the efficacy of this invention even when small amounts of novel flow agent are used.

Example I

Freshly-made sucrose from a sugar refiner was collected in screw cap containers from both a silo and a tractor-trailer truck. Cocoa powder was added to parts of both the silo and truck sucrose samples in amounts of 0.5% and 2.0% by weight, while portions of the samples from both the silo and truck were left unaltered in order to serve as control samples. One of every sample was exposed to two sets of conditions. Conditions Set I samples were sealed and placed in an oven set to 117° F. for 2 days and then allowed to sit open for 6 days at 67° F. and 62% relative humidity. Condition Set II samples were sealed and placed in an oven set to 117° F. for 7 days and then allowed to sit open for 22 days at 67° F. and 62% relative humidity. Visual observations revealed that cocoa powder-containing samples exposed to either Conditions Set I or II showed no sign of agglomeration while cocoa powder-free samples exposed to either Conditions Set I or II showed excessive clumping. This was true of samples collected from the truck as well as those collected from the silo. This small-scale example indicates that cocoa powder in amounts as small as 0.5% can dramatically reduce, if not eliminate, sugar agglomeration even after sugar has been exposed to temperature and humidity cycling.

Example II

The following experimentation was conducted with typical raw sugar collected from a refiner. Experimentation conducted using raw sugar in lieu of white, refined sugar revealed that cocoa powder added to raw sugar dramatically reduced agglomeration of the sugar after 14 days of closed storage at 110° F. and 14 days open storage at ambient temperatures ranging from 68° F. to 77° F. and about 62% relative humidity. The 2.5 kg of sugar tested in this experiment were subjected to 20-min of vibration treatment prior to heat treatment and 5 kg of consolidation pressure throughout the 14 days at elevated temperature. For the pure raw sugar variable, 98.8% of the total sugar, by weight, was agglomerated and extremely firm. However, for the 98:2 by weight of sugar to cocoa powder blend, only 6.0%, by weight of the blend, was agglomerated as measured via laboratory screening techniques. This small-scale example indicates that cocoa powder in amounts as small as 2% can dramatically reduce, if not eliminate, sugar agglomeration even for raw sugar that has been exposed to temperature and humidity cycling. It is worthwhile to note that raw sugar has a higher tendency to agglomerate than refined sugar.

Other embodiments of the present invention will be apparent to the skilled artisan. While the appended claims distinctly point to specific embodiments, embodiments falling within the spirit and scope of the preceding specification are also encompassed.

We claim:

1. A method to reduce agglomeration of sugar during transport and storage in bulk comprising the step of combining sugar with a flow agent to form a mixture, wherein said mixture comprises from about 0.1% to about 5% by weight flow agent such that agglomeration is reduced, and wherein said flow agent is selected from the group consisting of cocoa powder, peanut flour, and combinations thereof.

2. A method according to claim 1, wherein said sugar has a particle size range of from about 0.0001 mm to about 2.5 mm.

3. A method according to claim 1, wherein said flow agent has a particle size range of from about 0.1 microns to about 1000 microns.

4. A method according to claim 1, wherein said flow agent is desiccative in nature.

5. A method according to claim 1, wherein said sugar is sucrose.

6. A method according to claim 1, wherein said sugar is selected from the group consisting of raw sugar, brown sugar, confectioner's sugar, refined sugar, white refined sugar, pure cane sugar, and combinations thereof.

7. A method according to claim 1, wherein said flow agent is cocoa powder.

8. A method according to claim 1, wherein said mixture comprises from about 95% to about 99.9% by weight sugar and from about 0.1% to about 5% by weight cocoa powder.

* * * * *